US011797880B1

(12) United States Patent
Detroja et al.

(10) Patent No.: US 11,797,880 B1
(45) Date of Patent: Oct. 24, 2023

(54) SYSTEMS AND METHODS FOR DIGITAL CONTENT PROVISION

(71) Applicant: Meta Platforms, Inc., Menlo Park, CA (US)

(72) Inventors: Parth Popatlal Detroja, Redwood City, CA (US); Ferdi Adeputra, Jersey City, NJ (US); Dong Guo, Foster City, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 963 days.

(21) Appl. No.: 16/552,906

(22) Filed: Aug. 27, 2019

(51) Int. Cl.
*G06F 16/635* (2019.01)
*G06N 20/00* (2019.01)
*G06F 16/68* (2019.01)
*G06F 40/279* (2020.01)
*G06F 16/638* (2019.01)
*G06F 16/64* (2019.01)
*G06F 16/65* (2019.01)

(52) U.S. Cl.
CPC ........... *G06N 20/00* (2019.01); *G06F 16/635* (2019.01); *G06F 16/638* (2019.01); *G06F 16/64* (2019.01); *G06F 16/65* (2019.01); *G06F 16/686* (2019.01); *G06F 40/279* (2020.01)

(58) Field of Classification Search
CPC ..... G06N 20/00; G06F 16/635; G06F 16/638; G06F 16/64; G06F 16/65; G06F 16/686; G06F 40/279
See application file for complete search history.

(56) References Cited

U.S. PATENT DOCUMENTS

| | | | |
|---|---|---|---|
| 8,683,068 | B2 | 3/2014 | Jalili et al. |
| D734,773 | S | 7/2015 | Barbate |
| 9,129,227 | B1 | 9/2015 | Yee et al. |
| D754,714 | S | 4/2016 | Zhang et al. |
| D755,799 | S | 5/2016 | Finnis et al. |
| D757,051 | S | 5/2016 | Kim |
| D771,116 | S | 11/2016 | Dellinger et al. |
| D785,672 | S | 5/2017 | Keim et al. |
| D805,103 | S | 12/2017 | Dellinger |
| D805,540 | S | 12/2017 | Kim et al. |
| D824,420 | S | 7/2018 | Dellinger |
| D828,377 | S | 9/2018 | Dhide |
| 10,140,515 | B1 | 11/2018 | Waldo |

(Continued)

OTHER PUBLICATIONS

"Automatic Audio Segmentation Using A Measure of Audio Novelty" by Jonathan Foote, retrieved from https://ccrma.stanford.edu/workshops/mir2009/references/Foote_00.pdf (Year: 2009).*

(Continued)

*Primary Examiner* — Sanchita Roy
(74) *Attorney, Agent, or Firm* — Sheppard Mullin Ritcher & Hampton LLP

(57) ABSTRACT

Systems, methods, and non-transitory computer-readable media can receive training data for training a machine learning model. The machine learning model is trained based on the training data. The machine learning model is trained to identify highlighted portions in audio content items. A first audio content item is received. One or more highlighted portions are identified in the first audio content item based on the machine learning model.

20 Claims, 9 Drawing Sheets

(56) References Cited

U.S. PATENT DOCUMENTS

| | | |
|---|---|---|
| D853,416 S | 7/2019 | Ryan et al. |
| D855,069 S | 7/2019 | Shimomura |
| 10,345,998 B2 | 7/2019 | Sessak et al. |
| D857,707 S | 8/2019 | Kennedy et al. |
| D870,147 S | 12/2019 | Chen et al. |
| D873,280 S | 1/2020 | Beesley |
| D878,399 S | 3/2020 | Georgallis |
| D879,828 S | 3/2020 | Hohne et al. |
| D881,213 S | 4/2020 | Zimmerman et al. |
| D886,851 S | 6/2020 | Shimomura |
| D895,642 S | 9/2020 | Hoofnagle et al. |
| D895,663 S | 9/2020 | Jang et al. |
| 10,783,181 B1 | 9/2020 | Detroja et al. |
| D898,751 S | 10/2020 | Lu |
| 2008/0163119 A1 | 7/2008 | Kim et al. |
| 2009/0063974 A1 | 3/2009 | Bull et al. |
| 2010/0275120 A1 | 10/2010 | Pappas |
| 2015/0185995 A1* | 7/2015 | Shoemaker ....... H04M 1/72448 715/708 |
| 2015/0301718 A1 | 10/2015 | Trollope et al. |
| 2015/0350735 A1* | 12/2015 | Köser ................ H04N 21/2743 725/37 |
| 2016/0104154 A1 | 4/2016 | Milov et al. |
| 2016/0149956 A1 | 5/2016 | Birnbaum et al. |
| 2016/0217109 A1 | 7/2016 | Stacho et al. |
| 2017/0109128 A1 | 4/2017 | Parvizi et al. |
| 2018/0040117 A1 | 2/2018 | Castro et al. |
| 2018/0107367 A1 | 4/2018 | Rinneberg et al. |
| 2018/0225679 A1 | 8/2018 | Dougherty et al. |
| 2019/0028766 A1 | 1/2019 | Wold et al. |
| 2019/0385243 A1 | 12/2019 | Childers et al. |
| 2021/0397404 A1* | 12/2021 | Daga ....................... G06F 40/30 |

OTHER PUBLICATIONS

"Summarizing Popular Music Via Structural Similarity Analysis" by Matthew Cooperand Jonathan Foote retrieved from https://ieeexplore.ieee.org/stamp/stamp.jsp?tp=&arnumber=1285836&tag=1 (Year: 2003).*

M. A. Bartsch and G. H. Wakefield, "Audio thumbnailing of popular music using chroma-based representations," in IEEE Transactions on Multimedia, vol. 7, No. 1, pp. 96-104, Feb. 2005, doi: 10.1109/TMM.2004.840597 (Year: 2005).*

Kaneshiro B, Ruan F, Baker CW and Berger J (2017) "Characterizing Listener Engagement with Popular Songs Using Large-Scale Music Discovery Data". Front. Psychol. 8:416. doi: 10.3389/fpsyg.2017.00416 teaches determining and predicting user engagement with music content. (Year: 2017).*

"Towards Automatic Music Structural Analysis: Identifying Characteristic Within-Song Excerpts in Popular Music" By Bee Suan Ong dated Jul. 2005 and retrieved from http://mtg.upf.edu/files/publications/330410-DEA-BeeSuan2005.pdf teaches automatic audio-based music structure analysis. (Year: 2005).*

"Audio Player Interface", canstockphoto.com, Jun. 10, 2017, accessed Aug. 12, 2020, available online at <URL: https://www.canstockphoto.com/audio-player-interface-timeline-48168346.html>, (Year: 2017), 1 page.

"Vector Set With Interface For Music Player", canstockphoto.com, Jun. 15, 2013, accessed Aug. 12, 2020, available online at<URL: https://www.canstockphoto.com/vector-set-with-interface-for-music-14462379.html>, (Year: 2013), 1 page.

* cited by examiner

US 11,797,880 B1

SYSTEMS AND METHODS FOR DIGITAL CONTENT PROVISION

FIELD OF THE INVENTION

The present technology relates to the field of digital content platforms. More particularly, the present technology relates to user interfaces and techniques for sharing digital audio content.

BACKGROUND

Today, people often utilize computing devices (or systems) for a wide variety of purposes. Users can use their computing devices to, for example, interact with one another, access content, share content, and create content. In some cases, content items can include postings from members of a social networking system. Content items may include media content items, such as videos. Content items may be published to the social networking system or any other content platform for consumption by others.

SUMMARY

Various embodiments of the present technology can include systems, methods, and non-transitory computer readable media configured to receive training data for training a machine learning model. The machine learning model is trained based on the training data. The machine learning model is trained to identify highlighted portions in audio content items. A first audio content item is received. One or more highlighted portions are identified in the first audio content item based on the machine learning model.

In an embodiment, the training data comprises a plurality of training instances, and a first training instance of the plurality of training instances is associated with a second audio content item.

In an embodiment, the first training instances comprises audio content information associated with the second audio content item and historical user interaction information associated with the second audio content item.

In an embodiment, the audio content information comprises Mel spectrogram information associated with the second audio content item.

In an embodiment, the second audio content item is divided into a plurality of segments, and the historical user interaction information comprises: for one or more segments of the plurality of segments, a share frequency value indicative of how frequently users on a content platform have shared a clip of the audio content item that begins with the segment.

In an embodiment, each segment of the plurality of segments represents one beat of the audio content item.

In an embodiment, the training data further comprises one or more positive examples and one or more negative examples, each segment having a share frequency value above a first threshold is identified as a positive example, and each segment having a share frequency value below a second threshold is identified as a negative example.

In an embodiment, the first audio content item is divided into a plurality of segments, and the machine learning model is configured to output, for at least some segments of the plurality of segments, a score indicative of a likelihood for a user to share a clip of the first audio content item that begins with the segment.

In an embodiment, identifying one or more highlighted portions in the first audio content item based on the machine learning model comprises identifying one or more highlighted portions in the first audio content item based on the scores.

In an embodiment, identifying one or more highlighted portions in the first audio content item based on the scores comprises identifying one or more highlighted portions in the first audio content item based on the scores and one or more heuristic rules. The one or more heuristic rules comprises at least one of the following: a rule indicating that highlighted portions cannot be within a threshold time of each other, a rule indicating that at least one highlighted portion should be selected from a pre-defined initial portion of an audio content item, and a rule indicating that highlighted portions cannot be within a threshold level of similarity to one another.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
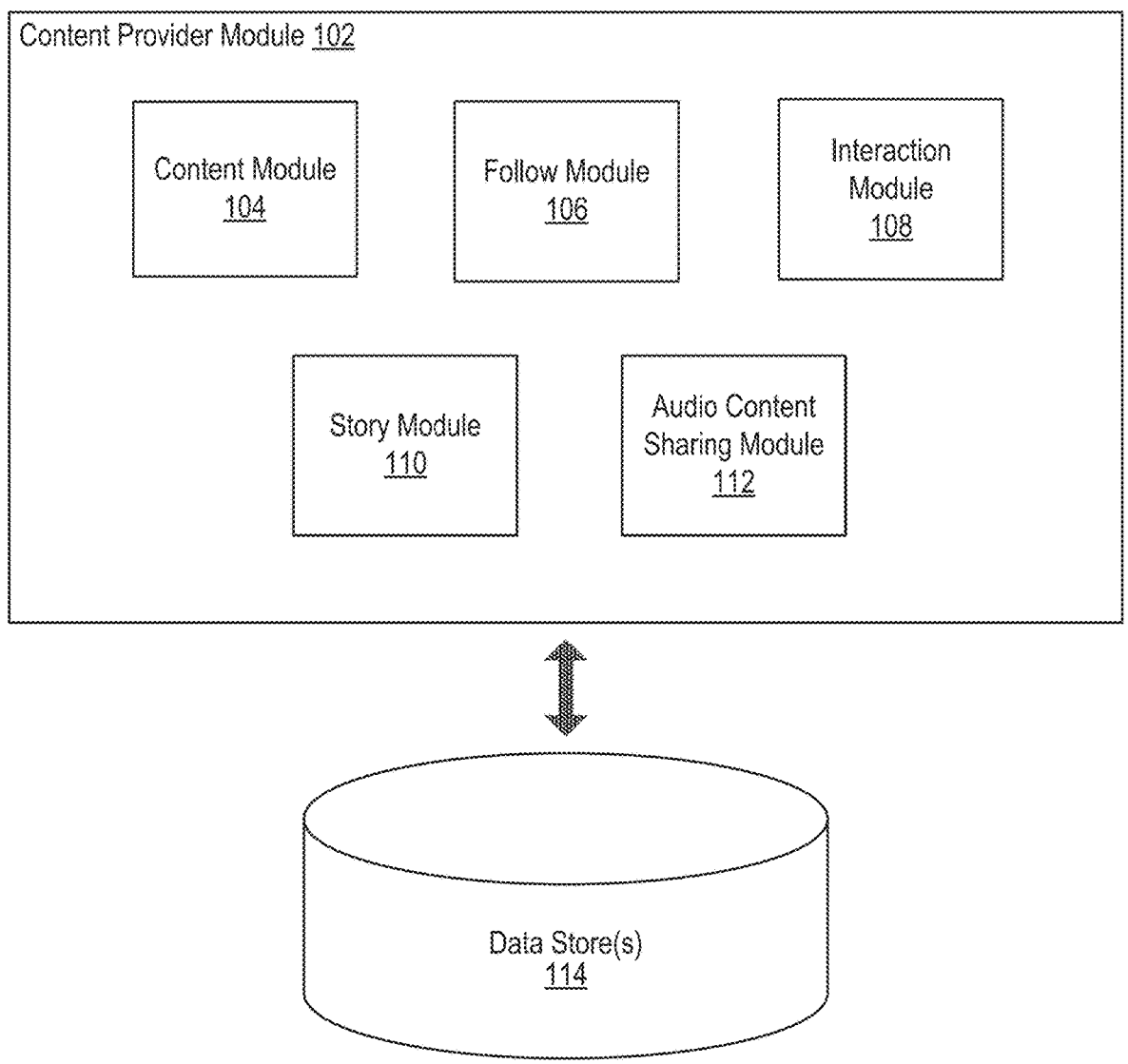
FIG. 1 illustrates an example system including a content provider module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Sharing Digital Audio Content

People often utilize computing devices (or systems) for a wide variety of purposes. Users can use their computing devices to, for example, interact with one another, access content, share content, and create content. In some cases, content items can include postings from members of a social networking system. Content items may include media content items, such as images, videos, or audio content. Content items may be published to the social networking system or any other content platform for consumption by others.

Content platforms, such as social networking systems, may provide users with user interfaces for creating and sharing content. For example, a social networking system may provide a computing application with various user interfaces that users can use to capture, edit, and share photos or videos. In many instances, such user interfaces may allow users to modify visual aspects of their content. However, users may also wish to add, modify, and/or share audio content as well. Conventional user interfaces often lack intuitive or user-friendly tools for editing and sharing audio content on a content platform. Many such tools, when provided, are limited in the portions of audio content that a user can share, or require the user to listen through large portions of an audio content item in order to identify the portion that the user wishes to share. Conventional approaches may not be effective in addressing these and other problems arising in computer technology.

An improved approach rooted in computer technology overcomes the foregoing and other disadvantages associated with conventional approaches specifically arising in the realm of computer technology. In general, users may be provided with a user interface that allows them to quickly and easily identify portions of audio content to be shared with other users on a content platform, such as a social networking system. For example, in certain embodiments, users may be provided with a user interface that allows them to select a portion of a song. The portion of the song can be added to other visual content that the user wishes to share (e.g., a photo or a video), or the portion of the song can be shared on its own as stand-alone audio content.

In an embodiment, for a particular audio content item, one or more highlighted portions can be identified. Each highlighted portion may correspond to a portion of the audio content item that has been identified as having a higher likelihood of being of interest to users and/or a higher likelihood of being shared by users. In certain embodiments, a machine learning model can be trained and utilized to automatically identify one or more highlighted portions in an audio content item based on characteristics of the audio content item. When a user indicates that he or she would like to share a portion of the audio content item, the user may be presented with a user interface. The user interface can present the user with the one or more highlighted portions that have been identified for the audio content item. The user can select the one or more highlighted portions and preview them. If the user would like to use one of the pre-identified highlighted portions, the user can select one of the highlighted portions to share on the content platform. However, in case a user would like to share a different portion of the audio content item, the user interface can also include a scrubber that a user can utilize to navigate through the audio content item and select the portion of the audio content item that he or she would like to share. The highlighted portions allow a user to quickly and easily select and share portions of an audio content item that have been pre-identified, while the scrubber still provides the user with full control over which portion of the audio content item the user would like to share. Furthermore, the machine learning model allows highlighted portions to be automatically identified in a large selection of audio content items. More details relating to the disclosed technology are provided below.

FIG. 1 illustrates an example system 100 including a content provider module 102, according to an embodiment of the present technology. The content provider module 102 can be configured to provide users with access to content posted to a digital content platform, such as a social networking system. As shown in the example of FIG. 1, the content provider module 102 can include a content module 104, a follow module 106, an interaction module 108, a story module 110, and an audio content sharing module 112. In some instances, the example system 100 can include at least one data store 114. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the content provider module 102 can be implemented in any suitable combinations.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be, in part or in whole, implemented as software running on one or more computing devices or systems, such as on a server system or a client computing device. In some instances, the content provider module 102 can be, in part or in whole, implemented within or configured to operate in conjunction with or be integrated with a social networking system (or service), such as a social networking system 630 of FIG. 6. Likewise, in some instances, the content provider module 102 can be, in part or in whole, implemented within or configured to operate in conjunction with or be integrated with a client computing device, such as the user device 610 of FIG. 6. For example, the content provider module 102 can be implemented as or within a dedicated application (e.g., app), a program, or an applet running on a user computing device or client computing system. The application incorporating or implementing instructions for performing functionality of the content provider module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The content provider module 102 can be configured to communicate and/or operate with the at least one data store 114, as shown in the example system 100. The data store 114 can be configured to store and maintain various types of data. In some implementations, the data store 114 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 114 can store information that is utilized by the content provider module 102. For example, the data store 114 can store one or more audio content items, highlighted portion information for the one or more audio content items, one or more machine learning models, training data for training the one or more machine learning models, and the like. It is contemplated that there can be many variations or other possibilities.

The content module 104 can be configured to provide users with access to content that is available through a digital content platform, such as a social networking system. In some instances, this content can include content items posted in content feeds accessible through the social networking system, i.e., content posts. For example, the content module 104 can provide a first user with access to content posts through an interface that is provided by a software application (e.g., a social networking application) running on a computing device of the first user. The first user can also interact with the interface to post content posts to the social networking system. Such content posts may include text, images, audio, and videos, to name some examples. For example, the first user can submit a content post to be published through the social networking system. In some embodiments, the content post can include, or reference, one or more media content items, such as images, video, audio, and/or text.

In various embodiments, other users of the social networking system can access content posts posted by the first user. In one example, the other users can access the content posts by searching for the first user by user name through an interface provided by a software application (e.g., a social networking application, browser, etc.) running on their respective computing devices. In some instances, some users may want to see content posts posted by the first user in their respective content feed. To cause content posts posted by the first user to be included in their respective content feed, a user can select an option through the interface to subscribe to, or "follow", the first user. The follow module 106 can process the user's request by identifying the user as a follower of (or "friend" of) the first user in the social networking system. As a result, some or all content posts that are posted by the first user can automatically be included in the respective content feed of the user. If the user decides that they no longer want to see content from the first user in their respective content feed, the user can select an option through the interface to unsubscribe from, or "unfollow", the first user. As a result, the follow module 106 can remove the association between the user and the first user so that content posts posted by the first user are no longer included in the content feed of the user.

In some instances, users may want to interact with content posts posted to a social networking system. For example, a user may want to endorse, or "like", a content post. In this example, the user can select an option provided in the interface to like the desired content post. The interaction module 108 can determine when a user likes a given content post and can store information describing this relationship. The interaction module 108 can also determine when other forms of user interaction are performed and can store information describing the interaction (e.g., information describing the type of interaction, the identity of the user, the identity of the user that posted the content post, and the content post, to name some examples). For example, the user may want to post a comment in response to a content post. In this example, the user can select an option provided in the interface to enter and post the comment for the desired content post. The interaction module 108 can determine when a user posts a comment in response to a given content post and can store information describing this relationship. Other forms of user interaction can include emoji-based reactions to a content post (e.g., selecting an option that corresponds to a particular reaction emoji, e.g., happy, sad, angry, etc.), re-sharing a content post, and transmitting a message to a user pertaining to a particular content post, for example.

In some embodiments, the story module 110 can provide an option that allows users to post their content as stories. In such embodiments, each user has a corresponding story collection in which the user can post content. When a user's story collection is accessed by another user, the story module 110 can provide content posted in the story collection to the other user for viewing. In certain embodiments, each user can have a story feed in which they can view stories posted by other users to their respective story collections. As such, a user's story feed can include the story collections of one or more users (e.g., one or more users that the user follows). In some embodiments, content posted in a user's story collection may be accessible by any user of the social networking system. In some embodiments, content posted in a user's story collection may only be accessible to followers of the user. In some embodiments, user stories posted to a user's story collection expire after a pre-defined time interval (e.g., every 24 hours). In such embodiments, content posted as a story in a story collection is treated as ephemeral content that is made inaccessible once the pre-defined time interval has elapsed. In contrast, content posted in certain other content feeds, such as a user (or follower) primary content feed, can be treated as non-ephemeral content that remains accessible for a longer and/or an indefinite period of time.

The audio content sharing module 112 can be configured to receive a user selection of an audio content item. The user selection may indicate that the user wishes to share a portion of the audio content item. The audio content sharing module 112 can provide one or more user interfaces that the user can utilize to select a portion of the audio content item for sharing. The one or more user interfaces can identify one or more pre-identified highlighted portions in the audio content item. In certain embodiments, a machine learning model can be trained and utilized to identify highlighted portions in audio content items. The one or more pre-identified highlighted portions may be selectable by the user so that the user can quickly and easily select one of the pre-identified highlighted portions. The user interface can also include a scrubber that allows the user to navigate through the audio content item to select a portion of the audio content item to share. Once the user selects a portion of the audio content item to share, the audio content sharing module 112 can publish the selected portion of the audio content item (e.g., to a content platform, such as a social networking system). More details regarding the audio content sharing module 112 will be provided below with reference to FIG. 2.

Figure 2:
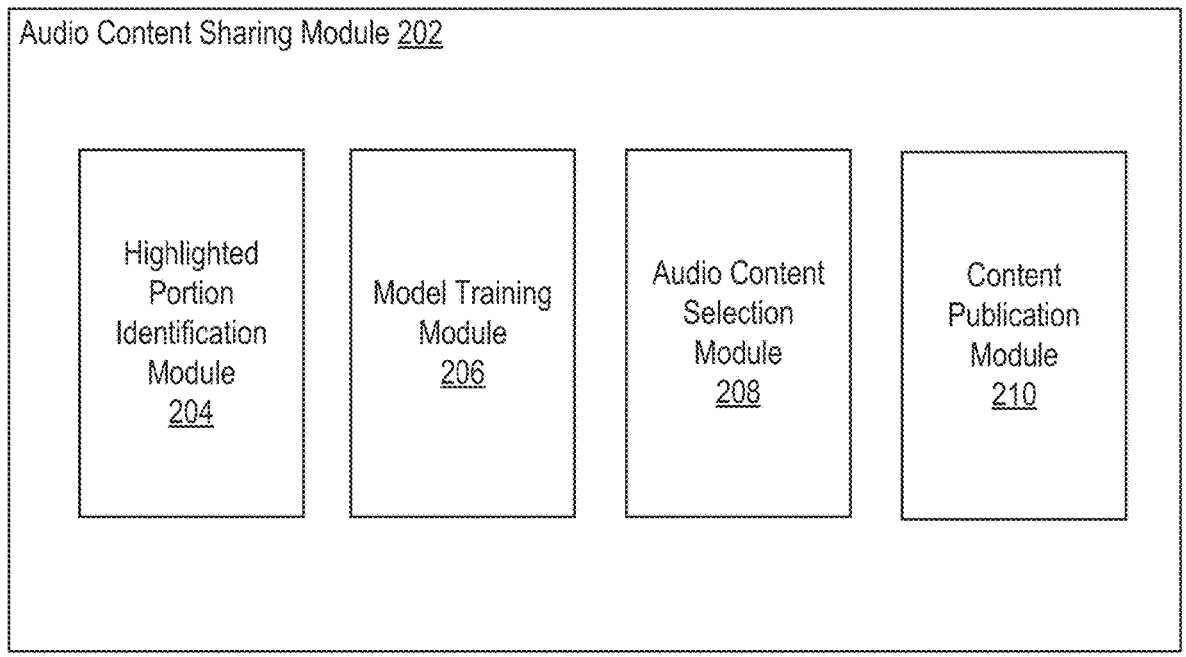
FIG. 2 illustrates an example audio content sharing module, according to an embodiment of the present technology.

FIG. 2 illustrates an example audio content sharing module 202, according to an embodiment of the present technology. In some embodiments, the audio content sharing module 112 of FIG. 1 can be implemented as the audio content sharing module 202. As shown in the example of FIG. 2, the audio content sharing module 202 can include a highlighted portion identification module 204, a model training module 206, an audio content selection module 208, and a content publication module 210.

The highlighted portion identification module 204 can be configured to identify one or more highlighted portions in each audio content item of a set of audio content items. Highlighted portions in an audio content item may represent portions of the audio content item that have been identified as having a higher likelihood of being shared by users than other portions of the audio content item. For example, a song may have the chorus identified as a highlighted portion and/or a popular line in the song identified as a highlighted portion. In certain embodiments, each highlighted portion in an audio content item may be identified and/or represented by a start time indicating the time position in the audio content item at which the highlighted portion begins. For example, if the chorus of a song begins at the one minute twenty second mark of the song, highlighted portion information for the song may indicate that a first highlighted portion begins at one minute twenty seconds. If the song also includes a popular line that begins at the two minute thirty second mark of the song, highlighted portion information for the song may indicate that a second highlighted portion begins at two minutes thirty seconds.

Highlighted portions can be identified by various techniques. In an embodiment, highlighted portions may be identified by one or more entities that own an audio content item (e.g., by an artist and/or a recording label that owns a song). In an embodiment, highlighted portions may be identified by a content platform (e.g., by a social networking system). In an embodiment, highlighted portions may be identified based on historical user interaction information. For example, for a particular song, historical user interaction information may indicate which portions of the song have been shared by users in the past, and how many times and/or how frequently those portions have been shared. Portions of the song that have been shared most frequently (e.g., the top one, top two, top three, etc.), or portions of the song that satisfy a sharing threshold (e.g., have been shared more than a threshold number of times) may be identified as highlighted portions. The highlighted portion identification module 204 may maintain highlighted portion information for one or more audio content items that identifies the highlighted portions (e.g., start positions for each highlighted portion) in each audio content item.

In certain embodiments, highlighted portions in an audio content item may be automatically identified based on a machine learning model. The machine learning model may be trained based on historical user interaction information to automatically identify one or more highlighted portions in an audio content item. For example, in one embodiment, the machine learning model may determine, for each segment (e.g., each second, each beat, etc.) of an audio content item a score indicative of a likelihood for a user to share a clip of the audio content item that begins with that segment. In other embodiments, rather than determining a score for each segment of an audio content item, a score may be determined for some of the segments in an audio content item. One or more highlighted portions can be identified in the audio content item based on the scores.

The model training module 206 can be configured to train a machine learning model based on training data. In an embodiment, the machine learning model can be trained to receive audio content information associated with an audio content item as input, and to identify one or more highlighted portions in the audio content item. As discussed above, highlighted portions in an audio content item may represent portions of the audio content item that have been identified as having a higher likelihood of being of interest to users and thus a higher likelihood of being shared by users than other portions of the audio content item. As also discussed above, a highlighted portion may be identified based on a start time associated with the highlighted portion, such that the machine learning model may be trained to identify one or more start times (e.g., starting time stamps) for highlighted portions in an audio content item.

In various embodiments, the machine learning model may be trained based on a set of training data. The training data can include a plurality of training instances. In certain embodiments, each training instance (or some of the training instances) can include audio content information associated with an audio content item, and historical user interaction information associated with the audio content item. In an embodiment, audio content information associated with an audio content item can comprise an image (or data) representation of the audio content item, such as a Mel spectrogram representation of the audio content item. Historical user interaction information can include, for example, historical sharing information associated with previous instances in which a portion of the audio content item (i.e., a clip of the audio content item) was shared by users on a content platform (e.g., a social networking system). The historical sharing information for an audio content item can identify, for each instance (or some instances) in which a clip of the audio content item was shared on the content platform, a starting time for the clip. For example, the historical sharing information may divide an audio content item into a plurality of segments. Each segment may represent, for example, one second of the audio content item. In another example, each segment may represent one beat of the audio content item. For example, if an audio content item (e.g., a song) has 60 beats per minute (bpm), each segment is 1 second long, or, as another example, if the audio content item has 120 beats per minute, each segment is 0.5 seconds long. If a user shares a clip of an audio content item, and the clip started in the 35th second of the audio content item, or the 20th beat of the audio content item, the historical sharing information may indicate this information. In this way, the historical sharing information may indicate, for each segment of an audio content item, or some (e.g., one or more) segments of an audio content item, how many times and/or how frequently users shared clips that began at the time position represented by the segment. For example, historical sharing information may indicate that, for a particular song, users began their clips at the first beat 10% of the time, at the second beat 1% of the time, at the third beat 0% of the time, at the fourth beat 0% of the time, at the 35th beat 40% of the time, and so forth.

The model training module 206 may have training data which comprises historical user interaction information (e.g., historical sharing information) and audio content information (e.g., a Mel spectrogram) for a plurality of audio content items. In various embodiments, the model training module 206 can be configured to automatically label the set of training data based on labeling criteria. In an embodiment, the set of labeling criteria may comprise a first threshold associated with a positive label for identifying positive training examples. For example, as discussed above, a training data instance may include an audio content item and historical sharing information for that audio content item. Furthermore, the historical sharing information may divide the audio content item into a plurality of segments (e.g., each second, or each beat), and may include, for at least some of the segments, a share frequency value indicative of how frequently users have historically shared clips of the audio content item that began at that segment. The set of labeling criteria may indicate that segments that satisfy (e.g., exceed) a first threshold should be labeled as positive examples. For example, the first threshold may indicate that any segment that has a value above 0.5 (e.g., indicating that greater than 50% of users that shared a clip from the audio content item began their clip at that segment) should be identified and labeled as a positive example. The set of labeling criteria may also indicate that segments that satisfy (e.g., fall below) a second threshold should be labeled as negative examples. For example, the second threshold may indicate that any segment that has a value below 0.05 (e.g., indicating that fewer than 5% of users that shared a clip from the audio content item began their clip at that segment) should be identified and labeled as a negative example. Many variations are possible.

Figure 3:
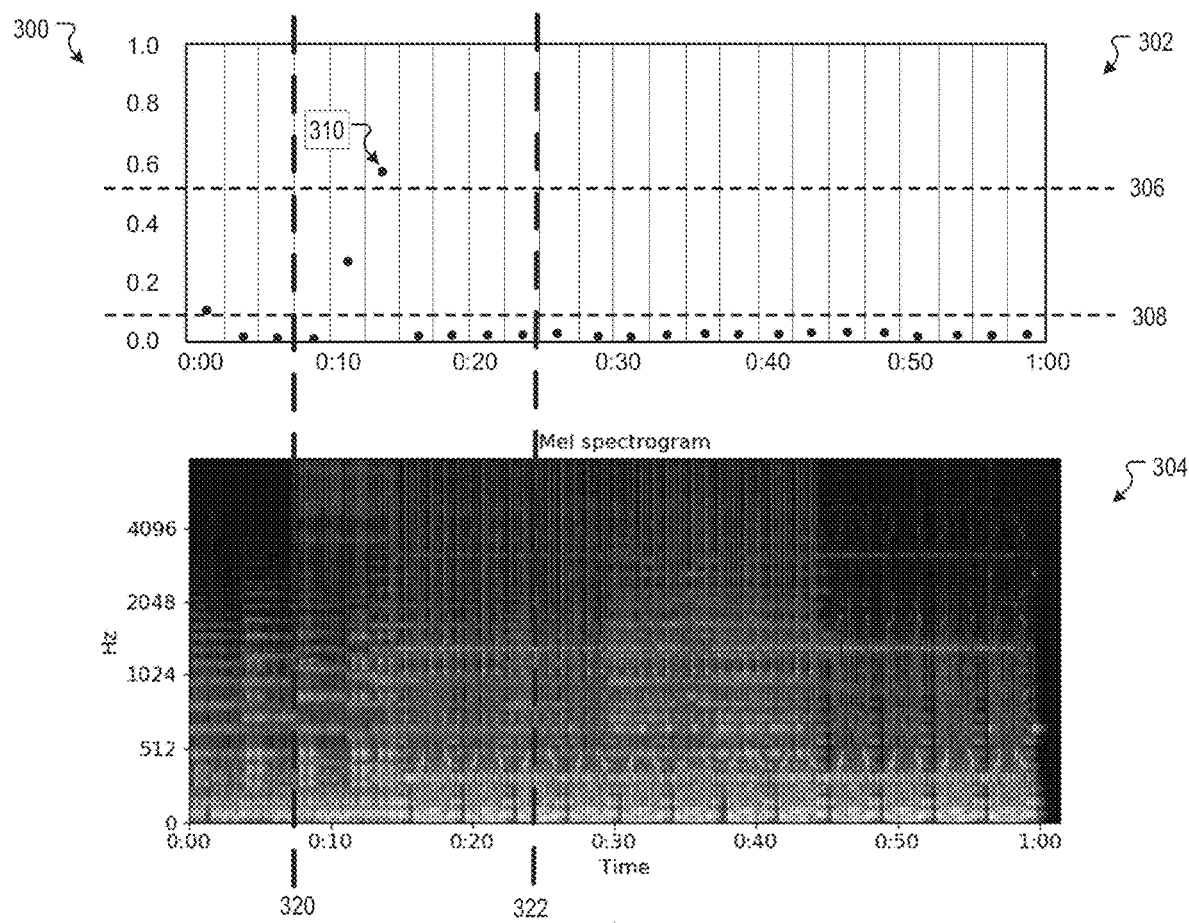
FIG. 3 illustrates an example set of training data, according to an embodiment of the present technology.

FIG. 3 illustrates an example training data instance 300, according to an embodiment of the present technology. The example training data instance 300 includes audio content information 304 for an audio content item and historical sharing information 302 for the audio content item. The audio content information 304 can include, for example, a Mel spectrogram associated with the audio content item. Other types of audio content information, apart from or in addition to a Mel spectrogram, can be used in other embodiments. In the example shown, the audio content item is a song with a bpm of approximately 24 beats per minute. Consequently, the historical sharing information 302 is broken up into segments (corresponding to beats) of approximately 2.5 seconds each. Each segment is associated with a share frequency value indicative of how frequently users have shared clips of the audio content item that began with that segment. In the depicted example, the share frequency value for a segment is equal to the number of times a clip of the audio content item was shared (e.g., on a content platform) that began with that segment divided by the total number of times a clip of the audio content item has been shared (e.g., on the content platform). For example, the historical sharing information 302 indicates that users began their shared clips with the first beat approximately 11% of the time, with the second/third/fourth beats approximately 0% of the time, with the fifth beat approximately 25% of the time, and with the sixth beat approximately 60% of the time. In the example scenario shown in FIG. 3, a first threshold 306 is associated with a positive label for identifying positive training examples, and indicates that all segments with a share frequency value above the threshold should be labeled as positive training examples. In this case, only one segment, represented by a data point 310, satisfies the first threshold 306 and is labeled as a positive training example. A second threshold 308 is associated with a negative label for identifying negative training examples, and indicates that all segments with a share frequency value below the threshold should be labeled as negative training examples. In this case, the vast majority of the segments are labeled as negative training examples. Any segments that do not satisfy either of the thresholds can remain unlabeled. Many variations are possible.

Audio content information 304 (e.g., Mel spectrogram information) associated with each positive and negative example (or at least some of the positive and negative examples) may be provided to the machine learning model to train the machine learning model. For example, if a segment is identified as a positive example, audio content information pertaining to the segment (e.g., audio content information for the 2.5 seconds that make up the segment), audio content information pertaining to a portion of the audio content item immediately preceding the segment (e.g., a certain number (e.g., 4) of seconds preceding the segment or a certain number of preceding segments), and audio content information pertaining to a portion of the audio content item immediately following the segment (e.g., a certain number (e.g., 8) of seconds following the segment or a certain number of following segments) can be provided to the machine learning model as a positive example. In FIG. 3, data point 310 is identified as a positive example. For example, a segment of the Mel spectrogram information that begins at line 320 and ends at line 322 can be provided to the machine learning model as a positive example. The same can be done for segments identified as negative examples.

Returning to FIG. 2, using the labeling criteria, the model training module 206 can automatically label a set of training data to identify positive and negative examples of training data. Using the techniques described above, each training data instance, associated with an audio content item, can be labeled to identify positive and negative training examples within the training data instance, and labeled audio content information (e.g., Mel spectrogram information) for one or more positive examples and/or one or more negative examples can be provided to the machine learning model. With this data, the machine learning model can be trained to identify features in audio content information (e.g., a Mel spectrogram) that are associated with positive examples (which represent segments of an audio content item that are indicative of a likely starting point for clips shared by users) and features in audio content information that are associated with negative examples (which are segments of an audio content item that are very unlikely to be starting points for clips shared by users). Once the machine learning model is trained in this way, the machine learning model can be configured to receive audio content information associated with a particular segment in an audio content item, and to determine, based on the audio content information, a score for the segment that is indicative of a likelihood that that segment will be the starting point for a clip that is shared by a user.

The highlighted portion identification module 204 can utilize the machine learning model trained by the model training module 206 to automatically identify one or more highlighted portions in an audio content item. The highlighted portion identification module 204 can be configured to receive audio content information associated with an audio content item. As discussed above, the audio content information may be segmented or divided into a plurality of segments (e.g., each segment representing one beat of the audio content item, or one second of the audio content item, etc.). The highlighted portion identification module 204 can provide the audio content information to the machine learning model. The machine learning model can be configured to output, for each segment or at least some segments in the audio content item, a score indicative of a likelihood of the segment being selected by a user as a starting point for a clip to be shared. For example, a higher score may indicate a higher likelihood that a particular segment is the start of a "popular" clip in the audio content item, while a lower score may indicate a lower likelihood that the segment is the start of a popular clip in the audio content item (or vice versa). In an embodiment, the highlighted portion identification module 204 can rank segments in the audio content item based on the scores. The highlighted portion identification module 204 can identify one or more highlighted portions in the audio content item (e.g., one or more starting points for highlighted portions in the audio content item) based on the scores. In certain embodiments, the highlighted portion identification module 204 may identify one or more highlighted portions based on a score threshold (e.g., segments having a score above the score threshold), based on a ranking threshold (e.g., the top 3 segments based on score), or a combination (e.g., the top 3 segments that satisfy a score threshold).

In certain embodiments, the highlighted portion identification module 204 can identify one or more highlighted portions in an audio content item based on the scores and further based on one or more heuristic rules. For example, a rule may indicate that one highlighted portion should be selected from a pre-defined initial portion of an audio content item (e.g., within the first 75 seconds of an audio content item). For example, a segment having the highest score in the first 75 seconds of the audio content item is selected as a highlighted portion and other segments that may fall within the first 75 seconds are not selected. In another example, a rule may indicate that two highlighted portions should not be within a threshold time from one another (e.g., within 10 seconds of one another). For example, if two highly scored segments are within 10 seconds of one another, the higher scored segment is selected and the lower scored segment is not.

In one embodiment, a rule may indicate that two segments that are within a threshold level of similarity to one another (e.g., duplicative of one another) should not both be selected as highlighted portions. For example, a song may have a chorus that repeats multiple times, and this rule may prevent multiple instances of the same chorus being selected as different highlighted portions. To implement this rule, the highlighted portion identification module 204 may compare audio content information associated with two segments (e.g., Mel spectrogram information) and calculate a similarity score between the two segments. If the similarity score indicates a threshold level of similarity between the two segments, only one of the two segments may be selected as a highlighted portion (e.g., the segment with the higher machine learning model score) to ensure that duplicate segments are not selected. In certain embodiments, time-stamped lyric information can also be used to check if segments are duplicates of one another (e.g., within a threshold level of similarity to one another). Many variations are possible.

Figure 4A:
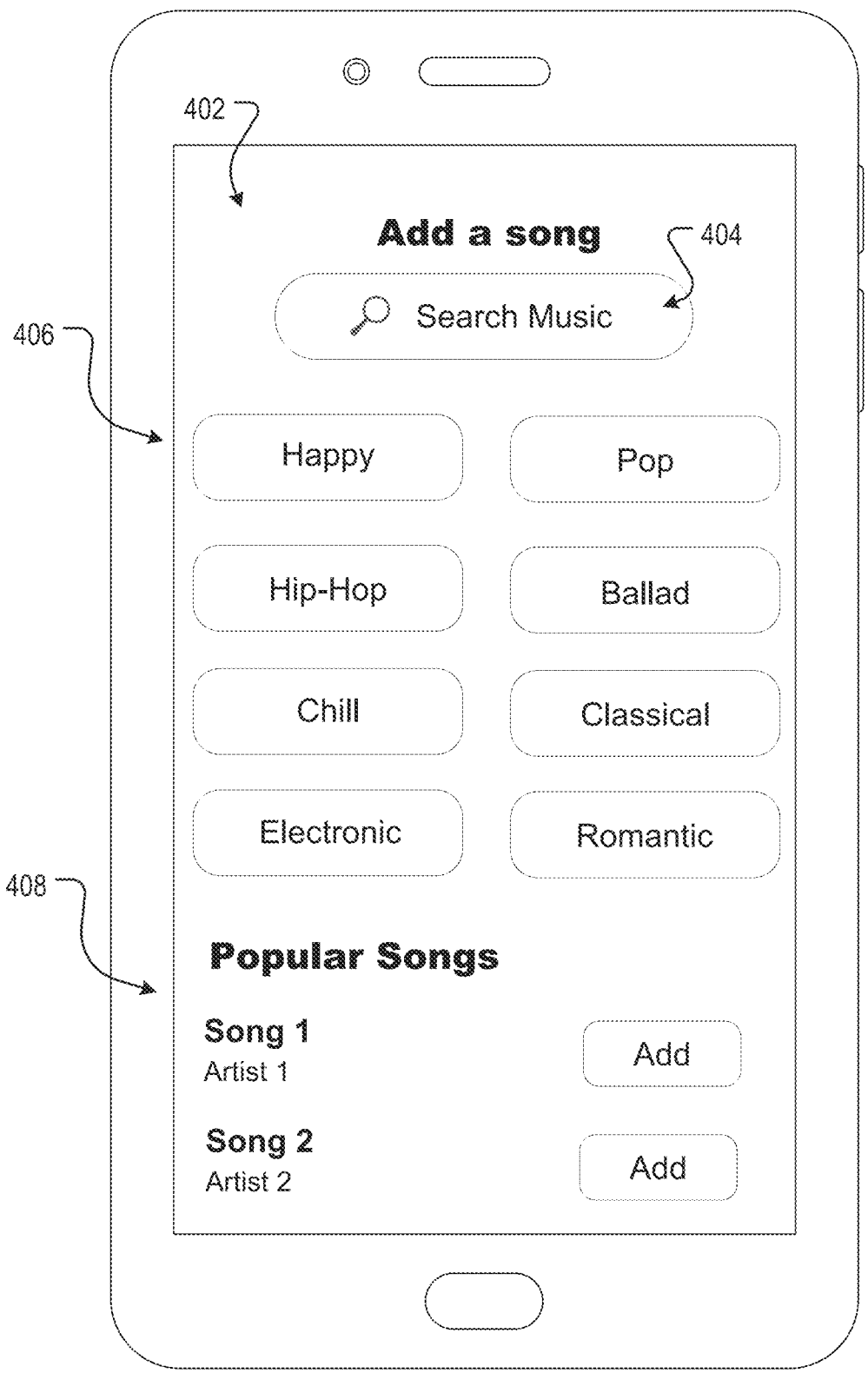
FIG. 4A illustrates an example user interface, according to an embodiment of the present technology.

The audio content selection module 208 can be configured to receive a user selection of an audio content item. The user may provide a selection of an audio content item via a user interface. FIG. 4A illustrates an example user interface 402 that a user can use to select an audio content item. The audio content selection module 208 can be configured to provide a user with a user interface that incorporates some or all of the features depicted in the example user interface 402 of FIG. 4A. The example user interface 402 includes a search bar 404 that a user can use to search for a particular audio content item. The user interface 402 also includes various categories 406 of music. The categories 406 are merely examples of various classifications of audio content, and many variations are possible. The user can select a particular category to view audio content items that fall within the selected category. The user interface 402 also includes a list of popular audio content items 408 (in this case, a list of popular songs). Popular songs can be identified in various ways, such as based on an extent to which they have been shared on a social networking system (e.g., satisfaction of a threshold level of sharing) or their appearance on a predetermined list of popular songs that is generated by an entity. Through the user interface 402, the user can select a particular audio content item that he or she would like to share.

Figure 4B:
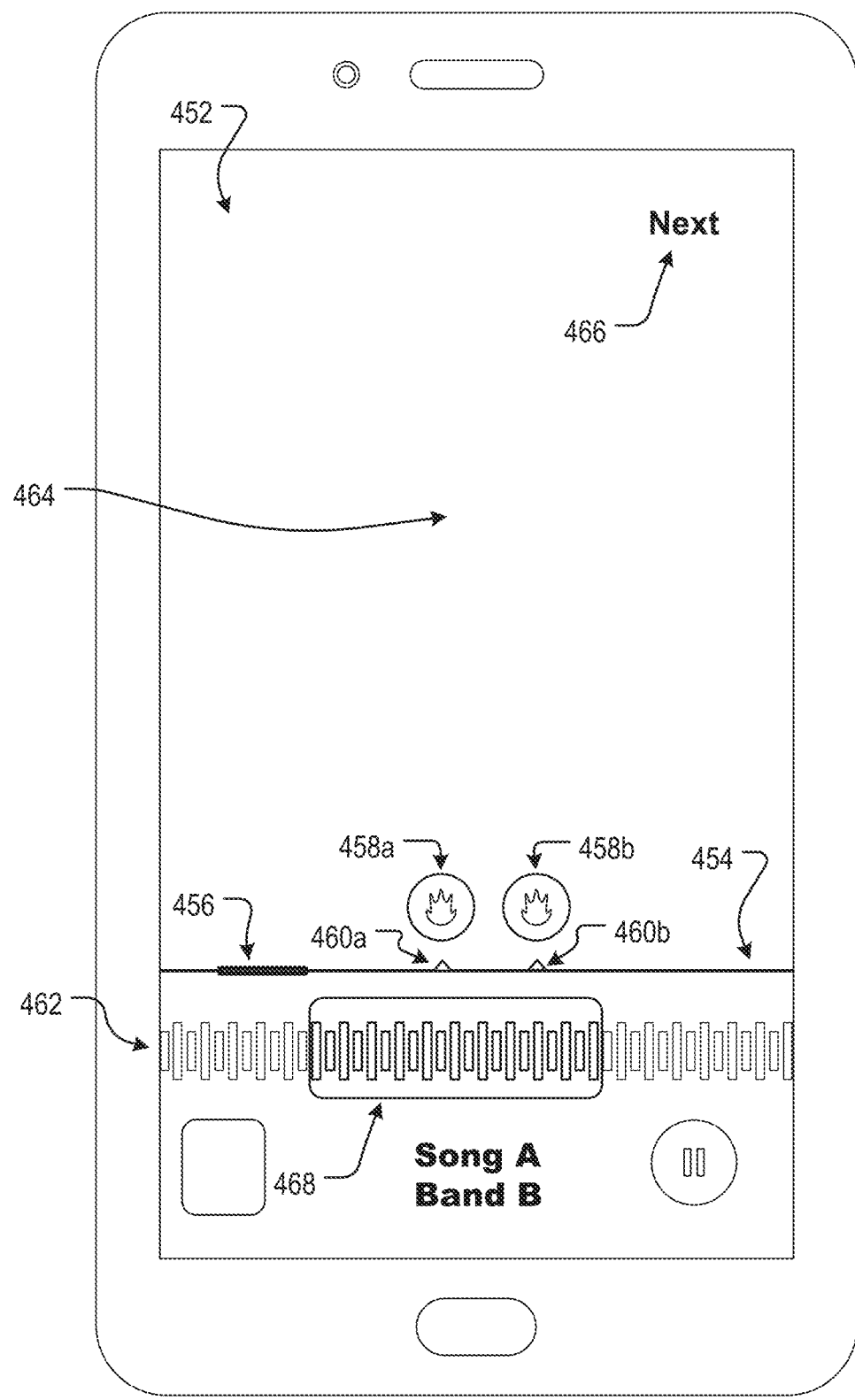
FIG. 4B illustrates an example user interface, according to an embodiment of the present technology.

In certain embodiments, once a user has selected a particular audio content item that the user would like to share a portion of, the audio content selection module 208 can provide a user interface that allows the user to identify a specific portion of the audio content item to share. FIG. 4B illustrates an example user interface 452 that a user can use to select a specific portion of an audio content item. The audio content selection module 208 can be configured to provide a user with a user interface that incorporates some or all of the features depicted in the example user interface 452.

In the example user interface 452, a user has selected a song entitled "Song A" by the musical group "Band B." The user interface 452 allows the user to select a portion of the song to share (e.g., on a social networking system). The user interface 452 includes a timeline 454 which represents the entirety of the audio content item, with a left-most end of the timeline 454 representing the start of the audio content item, and the right-most end of the timeline 454 representing the end of the audio content item. A playhead 456 indicates a current position within the audio content item. As the audio content item is played, or as the user selects different portions of the audio content item (as described below), the playhead 456 moves along the timeline 454.

The user interface 452 also identifies two highlighted portions in the audio content item via highlight indicators 458a, 458b. The position of each highlighted portion along the timeline 454 is indicated by highlighted portion position indicators 460a, 460b. As discussed above, each highlighted portion in an audio content item may be represented by a start time associated with the highlighted portion. For a particular audio content item, the audio content selection module 208 can receive highlighted portion information identifying one or more highlighted portions in the audio content item and their respective start times, and can determine the appropriate position for each highlight indicator 458a, 458b and highlighted portion position indicator 460a, 460b along the timeline 454 based on the length of the audio content item and the start time of the highlighted portion. For example, if a song is exactly three-minutes long, and a first highlighted portion begins at the one-minute mark, the audio content selection module 208 can place a highlight indicator and a highlighted portion position indicator ⅓ of the way from the left-most end of the timeline to the right-most end of the timeline.

The highlight indicators 458a, 458b are selectable by a user. For example, the user can select the highlight indicators 458a, 458b by an appropriate user gesture (e.g., a tap to portions of a touchscreen through which the highlight indicators 458a, 458b are presented) applied to the highlight indicators 458a, 458b. If a user selects the highlight indicator 458a associated with a first highlighted portion, a selected start time is automatically set to the start time associated with the first highlighted portion, and the playhead 456 automatically moves to the start time associated with the first highlighted portion as indicated by the highlighted portion position indicator 460a. If the user selects the highlight indicator 458b associated with a second highlighted portion, the selected start time is automatically set to the start time associated with the second highlighted portion, and the playhead 456 automatically moves to the start time associated with the second highlighted portion as indicated by the highlighted portion position indicator 460b. Alternatively, if the user would like to select a portion of the audio content item (e.g., a portion that is not identified as a highlighted portion), the user can utilize a scrubber 462 to "scrub" left or right. As the user scrubs left or right, the playhead 456 moves along the timeline 454 and, by manipulating the scrubber 462, the user can select any time position within the audio content item.

The audio content selection module 208 can be configured to provide a preview (audio preview) of the selected portion of an audio content item (e.g., by playing back the selected portion of the audio content item). A window 468 presents a visual depiction of the selected portion of the audio content item. In certain embodiments, the selected portion of an audio content item and/or the preview may be defined or referenced by a selected start time and a clip length. As discussed above, a user can identify a selected start time (i.e., the user can select a start time for the selected portion) by either selecting a highlighted portion (e.g., by selecting a highlight indicator 458*a*, 458*b*) or by using the scrubber 462 to move to different positions within the audio content item. In certain embodiments, the clip length may be a fixed length (e.g., 15 seconds), such that the preview presented to the user is a clip of a pre-determined fixed length that begins at the selected start time. In certain embodiments, the clip length may be defined based on an underlying media content item. For example, a user may wish to share a video. The user can select the video, and then can utilize the user interfaces 402, 452 to select a portion of an audio content item to add and/or overlay onto the video. In such scenarios, the clip length may be defined based on the length of the video. For example, if the video is an 8-second video, the clip length may be 8 seconds, or if the video is a 12-second video, the clip length may be 12 seconds. In certain embodiments, a background portion 464 of the user interface 452 may present the underlying media content item along with the audio preview of the selected portion of the audio content item so that the user can preview the underlying media content item with the selected portion of the audio content item. In various embodiments, the underlying media content item may include one or more images, one or more videos, or any other content items that can be shared to a content platform.

In certain embodiments, the preview can continuously loop the selected portion of the audio content item until the user either selects a different portion of the audio content item (e.g., by selecting a different highlighted portion and/or using the scrubber 462) or the user exits the user interface (e.g., by canceling the operation, or selecting a "Next" button 466 to proceed with publishing and/or sharing the selected portion of the audio content item). In certain embodiments, the audio content selection module 208 downloads only a portion of an audio content item that is needed for a preview. For example, if a preview includes a 15 second clip that begins from the 40-second position of an audio content item, the audio content selection module 208 can download (i.e., provide to a computing device of the user) a portion of the audio content item from the 40-second position to the 55-second position of the audio content item. When a user changes the preview by changing the selected start time for the selected portion of the content item (e.g., using the scrubber 462 and/or the highlight indicators 458*a*, 458*b*), the audio content selection module 208 can then download the portion of the audio content item needed for the new preview. In this way, users can be presented with previews more quickly than if they had to wait for the entire audio content item to download. Using the disclosed technology, the highlight indicators 458*a*, 458*b*, allow a user to quickly select a pre-identified portion of an audio content item with a single user interaction (e.g., a single tap), while the scrubber 462 provides users with greater control and freedom in selecting various portions of audio content items.

Figure 4C:
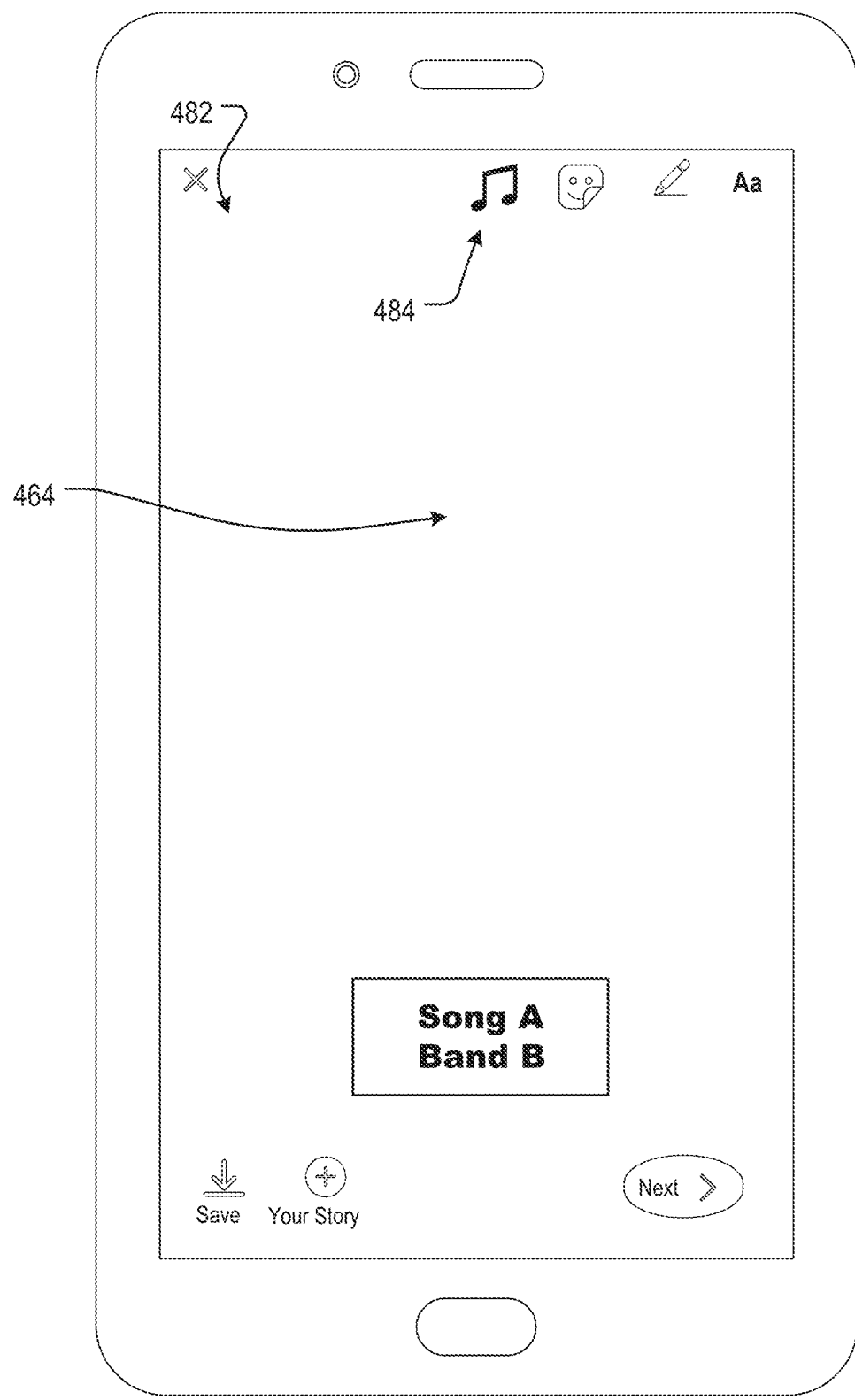
FIG. 4C illustrates an example user interface, according to an embodiment of the present technology.

As discussed above, in certain embodiments, once a user has selected a particular audio content item that the user would like to share a portion of (e.g., using the user interface 402 of FIG. 4A), the user may be provided with a user interface that allows the user to identify a specific portion of the audio content item to share (e.g., the user interface 452 of FIG. 4B). In other embodiments, once a user has selected a particular audio content item that the user would like to share a portion of (e.g., using the user interface 402 of FIG. 4A), the audio content selection module 208 can automatically select and apply a default portion of the audio content item. The default portion of the audio content item may be one of the highlighted portions that have been identified for the audio content item (e.g., by the highlighted portion identification module 204). For example, the default portion of the audio content item may be a highlighted portion that has a highest score, rating, likelihood, etc., as determined by the highlighted portion identification module 204. In the example user interface 482 of FIG. 4C, a user has selected a song entitled "Song A" by the musical group "Band B." A default portion of the selected audio content item has been automatically selected and applied to an underlying media content item (e.g., an underlying image or video). The underlying media content item may be presented in a background portion 464 of the user interface 482. The user interface 482 may present a preview of the default portion of the audio content item applied to the underlying media content item, as discussed above. However, if the user is dissatisfied with the default portion of the selected audio content item that has been automatically selected and applied, the user can select an icon 484. The icon 484 can open another user interface (e.g., the user interface 452 of FIG. 4B) that can allow the user to select a different portion of the audio content item.

As users utilize the user interfaces provided by the audio content selection module 208 to select clips to share on a content platform, training data for training the model training module 206 can be updated and maintained. Updated training data can be used to periodically re-train the machine learning model trained by the model training module 206 to improve the accuracy with which the machine learning model can automatically identify highlighted portions of audio content items.

Returning to FIG. 2, the content publication module 210 can be configured to publish and/or share a portion of an audio content item selected by a user to a content platform, such as a social networking system. As discussed above, the selected portion of the audio content item may be overlaid on or otherwise combined with an underlying media content item, and published as part of and/or in conjunction with the underlying media content items. In other instances, the selected portion of the audio content item may be published and/or shared as a stand-alone audio content item. In various embodiments, the audio content item may be shared as and/or as part of an ephemeral content item (e.g., to be published in one or more ephemeral content feeds), or as a non-ephemeral content item (e.g., to be published in one or more non-ephemeral content feeds).

Figure 5:
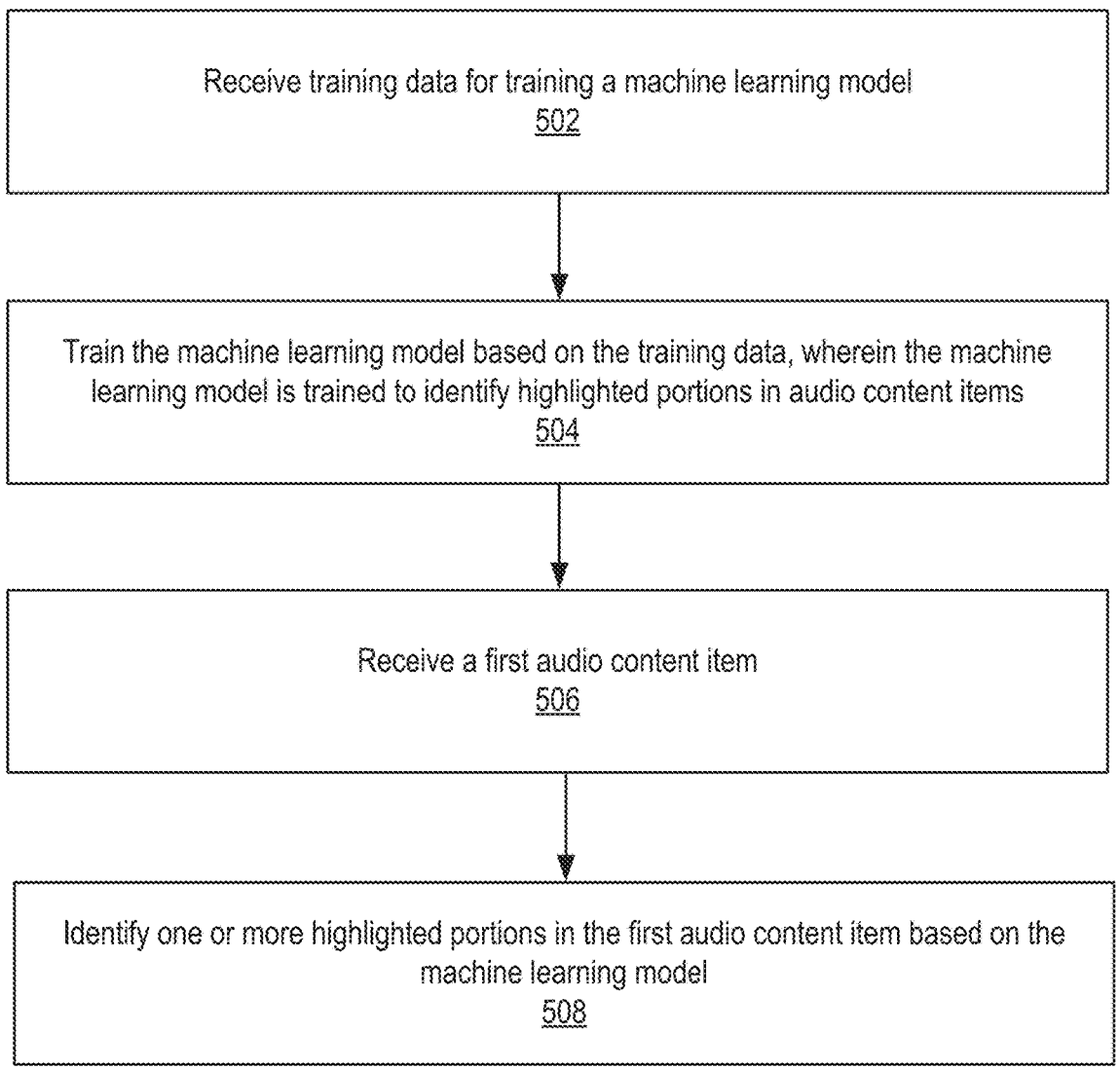
FIG. 5 illustrates an example method, according to an embodiment of the present technology.

FIG. 5 illustrates an example method 500, according to an embodiment of the present technology. It should be appreciated that there can be additional, fewer, or alternative steps performed in similar or alternative orders, or in parallel, within the scope of the various embodiments discussed herein unless otherwise stated.

At block 502, the example method 500 can receive training data for training a machine learning model. At block 504, the example method 500 can train the machine learning model based on the training data, wherein the machine learning model is trained to identify highlighted portions in audio content items. At block 506, the example method 500 can receive a first audio content item. At block 508, the example method 500 can identify one or more highlighted portions in the first audio content item based on the machine learning model.

It is contemplated that there can be many other uses, applications, and/or variations associated with the various embodiments of the present technology. For example, in some cases, user can choose whether or not to opt-in to utilize the disclosed technology. The disclosed technology can also ensure that various privacy settings and preferences are maintained and can prevent private information from being divulged. In another example, various embodiments of the present technology can learn, improve, and/or be refined over time.

Social Networking System—Example Implementation

Figure 6:
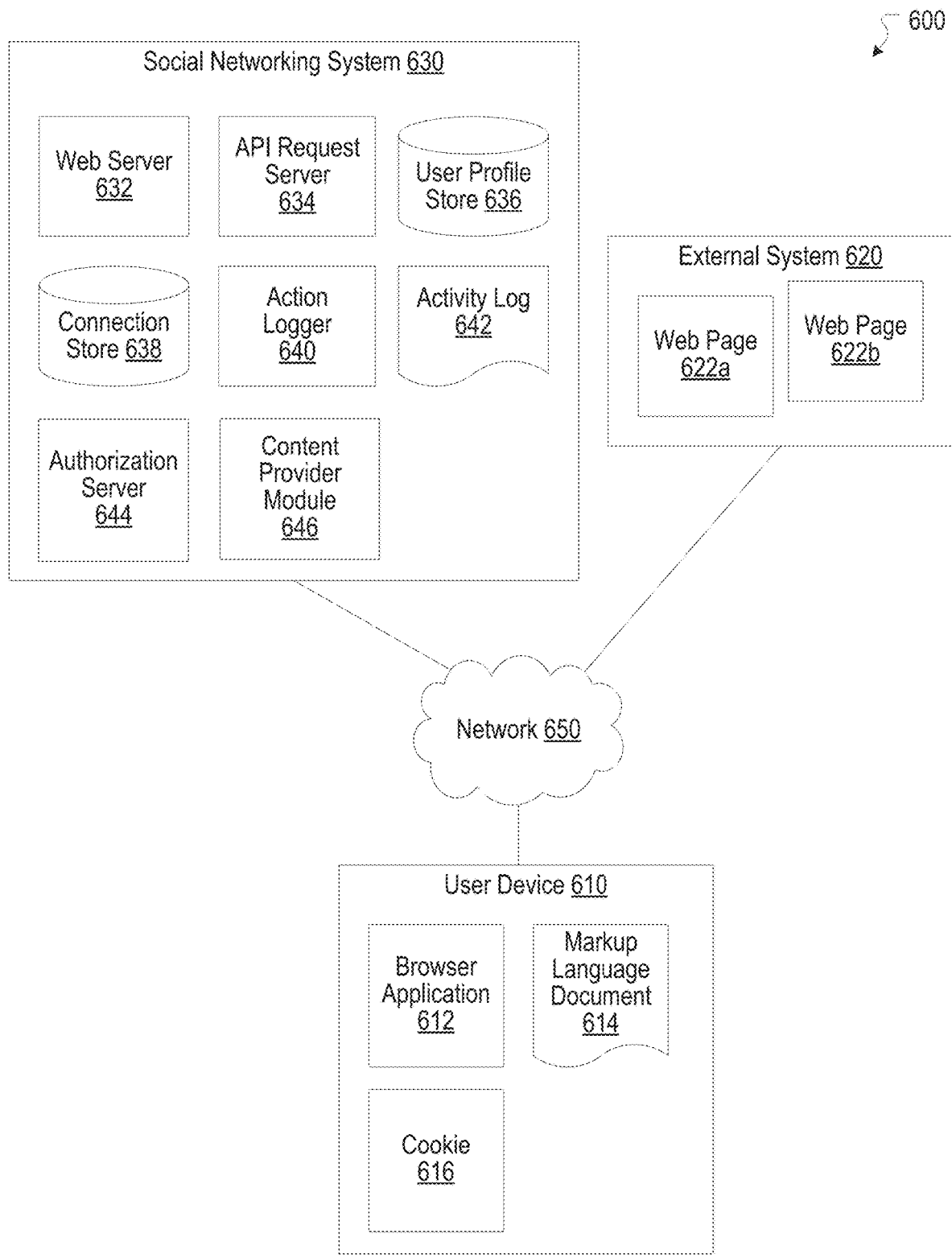
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, according to an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622*a*, 622*b*, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102, as discussed in more detail herein. As discussed previously, it should be appreciated that there can be many variations or other possibilities. For example, in some embodiments, one or more functionalities of the content provider module 646 can be implemented in the user device 610. As discussed previously, it should be appreciated that there can be many variations or other possibilities.

Hardware Implementation

Figure 7:
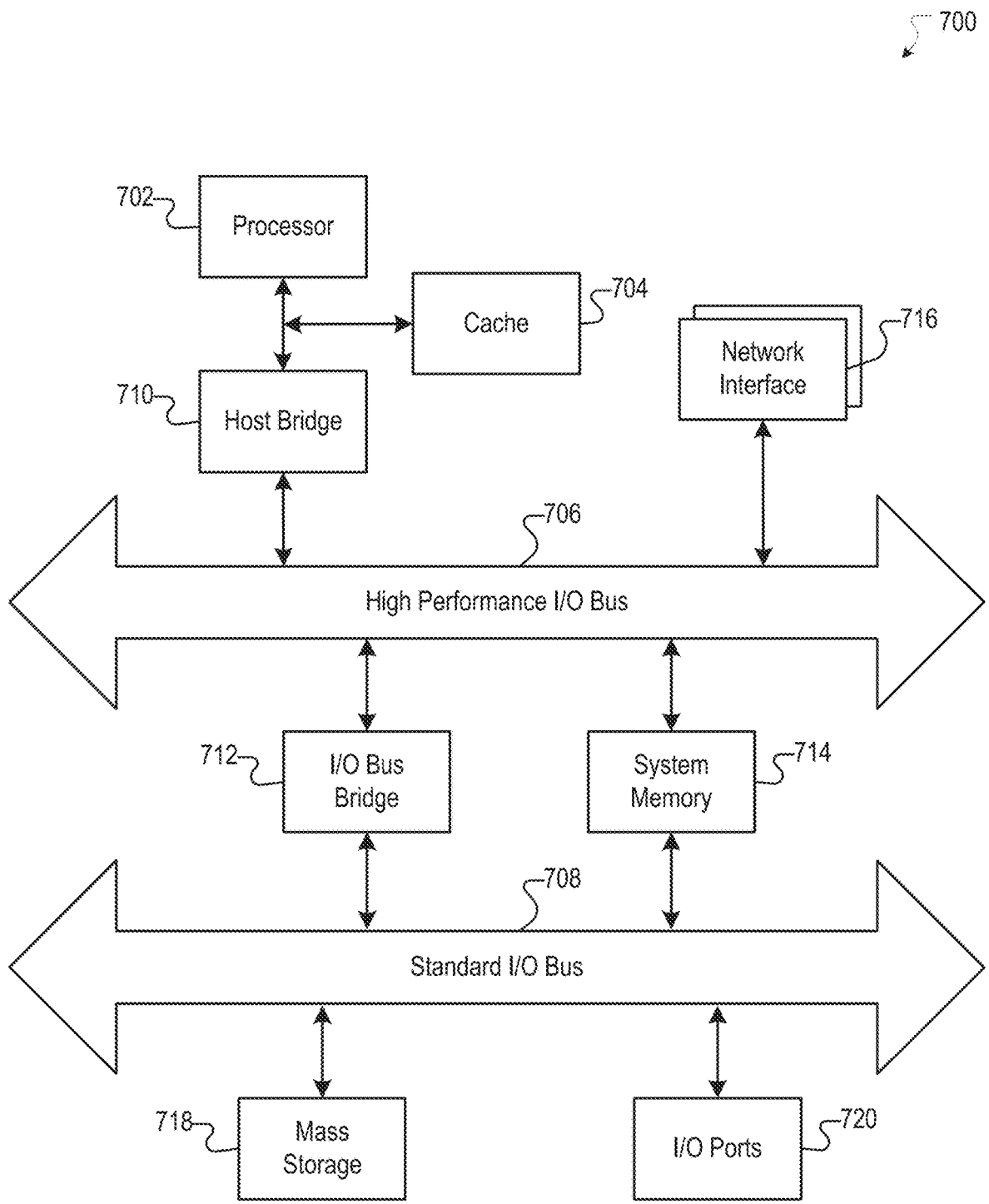
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the present technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computing system, training data for training a machine learning model, wherein the training data comprises a plurality of training instances based on portions of training audio content items shared by users;
   training, by the computing system, the machine learning model based on the training data, wherein the machine learning model is trained to identify highlighted portions in input audio content items that correspond with the portions of the input audio content items that satisfy a sharing threshold, wherein the highlighted portions are portions in respective input audio content items between a respective start time indicator and a respective end time indicator;
   receiving, by the computing system, a first audio content item;
   determining, by the computing system, portions in the first audio content item that satisfy the sharing threshold based on the machine learning model; and
   providing, by the computing system, indicators that indicate the portions in the first audio content item that satisfy the sharing threshold.

2. The computer-implemented method of claim 1, wherein the training data comprises a first training instance of the plurality of training instances associated with a second audio content item.

3. The computer-implemented method of claim 2, wherein the first training instance comprises audio content information associated with the second audio content item and historical user interaction information associated with the second audio content item.

4. The computer-implemented method of claim 3, wherein the audio content information comprises Mel spectrogram information associated with the second audio content item.

5. The computer-implemented method of claim 3, wherein the second audio content item is divided into a plurality of segments, and the historical user interaction information comprises:
   for one or more segments of the plurality of segments, a share frequency value indicative of how frequently users on a content platform have shared a clip of the second audio content item that begins with the respective segment.

6. The computer-implemented method of claim 5, wherein each segment of the plurality of segments represents one beat of the second audio content item.

7. The computer-implemented method of claim 5, wherein:
   the training data further comprises one or more positive examples and one or more negative examples,
   each segment having a share frequency value above a first threshold is identified as a positive example, and
   each segment having a share frequency value below a second threshold is identified as a negative example.

8. The computer-implemented method of claim 1, wherein the first audio content item is divided into a plurality of segments, and the machine learning model is configured to output, for at least some of the segments of the plurality of segments, a score indicative of a likelihood for a user to share a clip of the first audio content item that begins with the respective segment.

9. The computer-implemented method of claim 8, wherein determining the portions in the first audio content item that satisfy the sharing threshold based on the machine learning model comprises determining the portions in the first audio content item based on the scores.

10. The computer-implemented method of claim 9, wherein determining the portions in the first audio content item that satisfy the sharing threshold comprises determining the portions in the first audio content item based one or more heuristic rules, wherein the one or more heuristic rules comprises at least one of the following:
    a rule indicating that highlighted portions cannot be within a threshold time of each other,
    a rule indicating that at least one highlighted portion should be selected from a pre-defined initial portion of an audio content item, and
    a rule indicating that highlighted portions cannot be within a threshold level of similarity to one another.

11. A system comprising:
    at least one processor; and
    a memory storing instructions that, when executed by the at least one processor, cause the system to perform a method comprising:
       receiving training data for training a machine learning model, wherein the training data comprises a plurality of training instances based on portions of training audio content items shared by users;
       training the machine learning model based on the training data, wherein the machine learning model is trained to identify highlighted portions in input audio content items that correspond with the portions of the input audio content items that satisfy a sharing threshold, wherein the highlighted portions are respective input portions in the audio content items between a respective start time indicator and a respective end time indicator;
       receiving a first audio content item;
       determining portions in the first audio content item that satisfy the sharing threshold based on the machine learning model; and
       providing indicators that indicate the portions in the first audio content item that satisfy the sharing threshold.

12. The system of claim 11, wherein the training data comprises a first training instance of the plurality of training instances associated with a second audio content item.

13. The system of claim 12, wherein the first training instance comprises audio content information associated with the second audio content item and historical user interaction information associated with the second audio content item.

14. The system of claim 13, wherein the audio content information comprises Mel spectrogram information associated with the second audio content item.

15. The system of claim 13, wherein the second audio content item is divided into a plurality of segments, and the historical user interaction information comprises: for one or more segments of the plurality of segments, a share frequency value indicative of how frequently users on a content platform have shared a clip of the second audio content item that begins with the respective segment.

16. A non-transitory computer-readable storage medium including instructions that, when executed by at least one processor of a computing system, cause the computing system to perform a method comprising:
    receiving training data for training a machine learning model, wherein the training data comprises a plurality of training instances based on portions of training audio content items shared by users;
    training the machine learning model based on the training data, wherein the machine learning model is trained to identify highlighted portions in input audio content items that correspond with the portions of the input audio content items that satisfy a sharing threshold, wherein the highlighted portions are portions in respective input audio content items between a respective start time indicator and a respective end time indicator;
    receiving a first audio content item;
    determining portions in the first audio content item that satisfy the sharing threshold based on the machine learning model; and
    providing indicators that indicate the portions in the first audio content item that satisfy the sharing threshold.

17. The non-transitory computer-readable storage medium of claim 16, wherein the training data comprises a first training instance of the plurality of training instances associated with a second audio content item.

18. The non-transitory computer-readable storage medium of claim 17, wherein the first training instance comprises audio content information associated with the second audio content item and historical user interaction information associated with the second audio content item.

19. The non-transitory computer-readable storage medium of claim 18, wherein the audio content information comprises Mel spectrogram information associated with the second audio content item.

20. The non-transitory computer-readable storage medium of claim 18, wherein the second audio content item is divided into a plurality of segments, and the historical user interaction information comprises: for one or more segments of the plurality of segments, a share frequency value indicative of how frequently users on a content platform have shared a clip of the second audio content item that begins with the respective segment.

* * * * *